March 23, 1926.
C. MONTHAN
1,578,162
ASPARAGUS HARVESTER
Filed Feb. 28, 1924 2 Sheets-Sheet 1
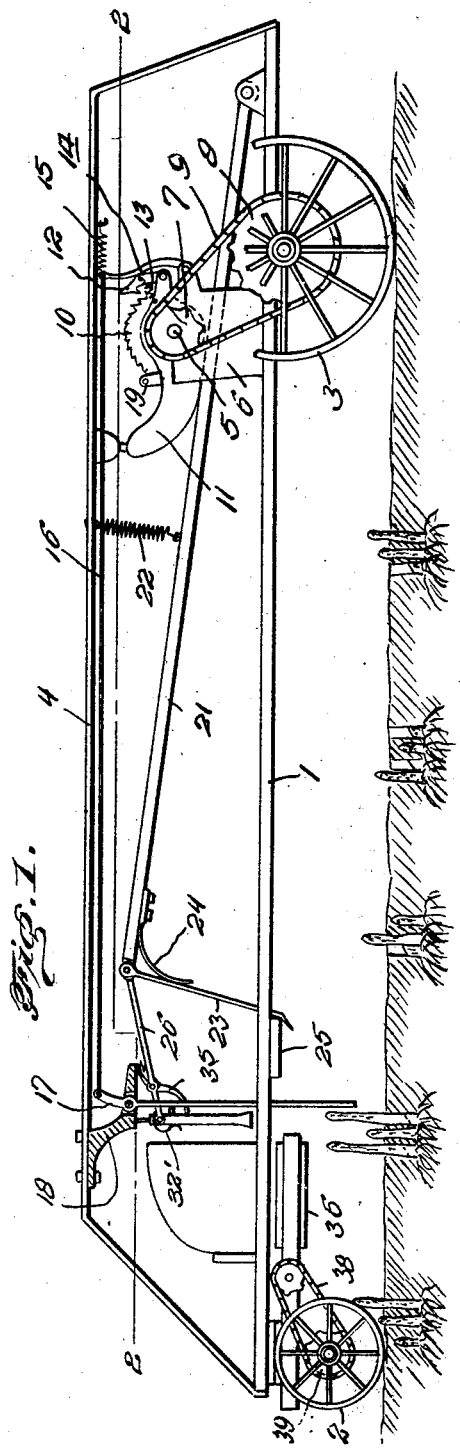
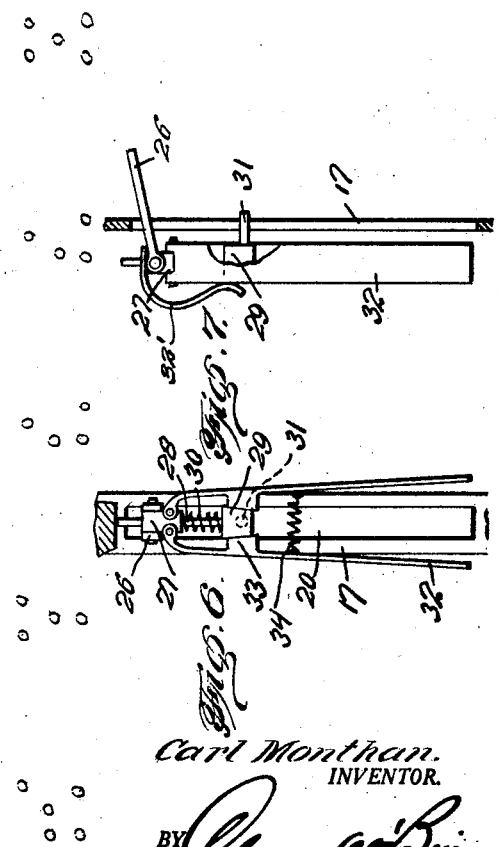
Carl Monthan.
INVENTOR.
BY
ATTORNEYS.

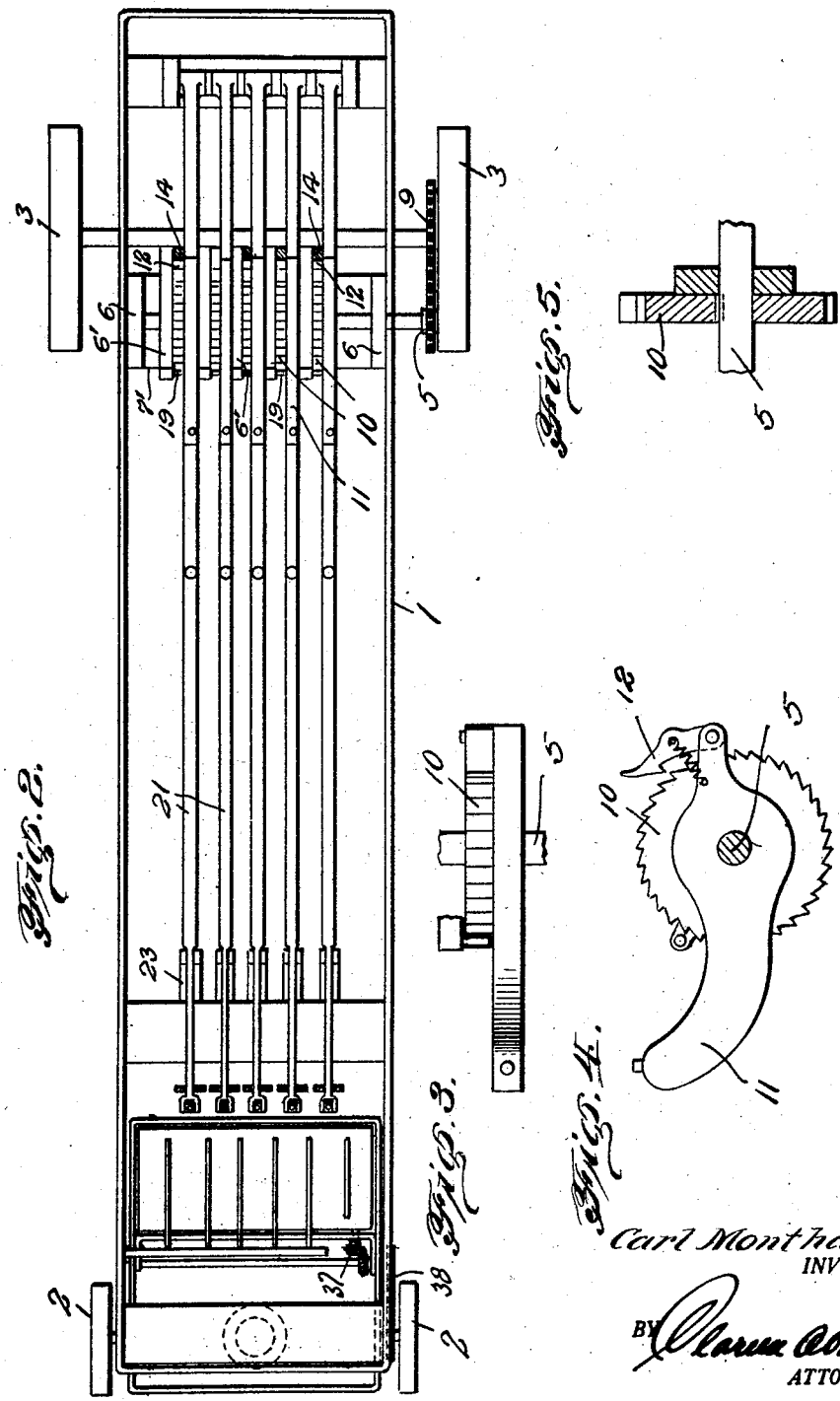

Patented Mar. 23, 1926.

1,578,162

UNITED STATES PATENT OFFICE.

CARL MONTHAN, OF VAIL, ARIZONA.

ASPARAGUS HARVESTER.

Application filed February 28, 1924. Serial No. 695,788.

*To all whom it may concern:*

Be it known that I, CARL MONTHAN, a citizen of the United States of America, residing at Vail, in the county of Pima and State of Arizona, have invented certain new and useful Improvements in Asparagus Harvesters, of which the following is a specification.

This invention relates to asparagus harvesters and it consists in the novel features hereinafter described and claimed.

An object of the invention is to provide a harvester especially adapted to be used for cutting the standing stems of asparagus plants which have matured to such a degree as to have arrived at an edible or marketable stage of development.

With this object in view, the harvester comprises a wheel mounted frame with a trip mechanism mounted thereon and adapted to encounter the properly matured stems of the plants as the machine is drawn along the row and throw a cam into operation whereby a cutter is projected toward the stem of the plant and the stem of the plant is cut just below the surface of the soil. Means are provided for picking up the cut stems, elevating the same and depositing them upon a conveyor with which the apparatus is provided.

In the accompanying drawings:—

Figure 1 is a side elevation of the asparagus harvester, with parts broken away and parts shown in section.

Figure 2 is a horizontal sectional view of the harvester cut on the line 2—2 of Figure 1.

Figure 3 is a detailed top view of the ratchet mechanism used upon the harvester.

Figure 4 is a side elevation of said ratchet mechanism.

Figure 5 is a transverse sectional view of the ratchet mechanism.

Figure 6 is a fragmentary detail sectional view of the stem grasping and elevating mechanism used upon the harvester.

Figure 7 is a side view of the stem grasping and elevating mechanism, showing parts thereof broken away and parts in section.

The asparagus harvester comprises a relatively long frame 1 mounted at its forward end upon ground engaging wheels 2 and at its rear end upon ground engaging wheels 3. A superstructure 4 is mounted upon the frame 1. A shaft 5 is disposed transversely across the rear portion of the frame 1 and is journalled thereon in suitable bearings 6 and 6' rising from the cross member 7' supported transversely on the rear portion of the frame 1. A sprocket wheel 7 is mounted upon the end portion of the shaft 5. A sprocket wheel 8 is attached to the side of one of the rear wheels 3, and a sprocket chain 9 is trained around the sprocket wheels 7 and 8 and is adapted to transmit rotary movement from the rear wheels 3 to the shaft 5. A series of ratchet wheels 10 is keyed upon the shaft 5, the said wheels being spaced from each other.

Cam arms 11 are pivoted upon the shaft 5 and carry at their rear ends pivoted pawls 12 which are normally held out of engagement with the teeth of the ratchet wheels 10 by springs 13 which are connected at one end with the arms and at their other ends with the intermediate portions of the said pawls as best shown in Figure 1 of the drawings. Vertically disposed levers 14 are pivoted at their lower ends upon a shaft extending between the bearing blocks 6 and springs 15 are connected at one end with the upper ends of the levers 14 and at their rear ends with the superstructure 4. Rods 16 are pivotally connected at their rear ends with the upper ends of the levers 14 and the forward ends of the rods 16 are pivotally connected with the upper ends of trip members 17 which are pivoted in a bracket 18 carried by the superstructure 4. The lower ends of the trip members 17 are spaced above the surface of the soil.

As the harvester is drawn along a row of standing plants, the lower portions of the trip members 17 encounter the upper portions of the taller stems and the lower portions of the trip members 17 are swung rearwardly whereby the attached rods 16 are moved longitudinally against the tension of the springs 15 and the intermediate portions of the levers 14 engage the intermediate portions of the pawls 12 and force the pawls into engagement with the teeth of the ratchet wheels 10. Thus the cam arms 11 are fixed with relation to the shaft 5 and turn with the same and operate stem cutting mechanisms hereinafter to be explained. The pawls 12 move with the wheels 10 until their ends come in contact with pins 19 which are disposed transversely over the upper portions of the wheels 10, and when the pawls engage the said pins, they are lifted out of engagement with the teeth of the wheels and the parts are returned to normal positions as will be explained. Bars 21 are disposed longitudinally of the frame 1 and are pivoted at their rear ends at the rear portion of the said frame. The forward ends of the bars 21 are normally held in elevated positions by means of tractile springs 22 which are connected at their upper ends with the superstructure 4 and at their lower ends with the bars 21. Blade members 23 are pivotally connected at their upper ends with the forward portions of the bars 21 and springs 24 are carried by the bars 21 and bear against the intermediate and rear portions of the blade members 23. A guide member 25 is disposed transversely of the frame 1, and the lower forward portions of the blade members 23 are normally held in engagement with the rear edge of the guide member 25 under the influence of the springs 24. The lower edges of the cam arms 11 rest upon the upper edges of the bars 21 at points between the ends of said bars.

When the cam arms 11 are turned with the shaft 5 as hereinbefore described, their cam edges depress the forward ends of the bars 21 against the tension of the springs 22 and the blade members 23 are moved downwardly and their lower cutting edges are projected below the surface of the soil and cut the stems of the plants just below the surface of the soil. When the pawls 12 are disengaged from the teeth of the wheels 10 by contact with the pins 19, the springs 22 returned the bars 21 to their normal positions as shown in Figure 1 of the drawing.

The bars 21 are provided at their forward portions with angularly disposed extensions 26 which pass through the slots 20 in the trip members 17. Sleeves 27 are pivotally mounted at the forward ends of the extensions 26 and are located in advance of the forward sides of the trip members 17. Stems 28 are slidably mounted in the sleeves 27 and carry at their lower ends wedge shaped blocks 29. Coil springs 30 are interposed between the lower ends of the sleeves 27 and the upper sides of the blocks 29. Pins 31 are carried by the blocks 29 and are loosely received in the slots 20 of the trip members 17. Gripper fingers 32 are pivoted at their upper ends to the sleeves 27 and are disposed one at each side of the said sleeves. The said gripper members are provided at points between their ends and at their inner sides with lugs 33 which bear at their inner faces against the opposite sides of the wedge shaped blocks 29. Springs 34 bridge the spaces between the gripper fingers 32 and are secured at their ends to the intermediate portions of the gripper members and are disposed below the lugs 33 thereof. Ogee shaped levers 35 are pivoted at points between their ends to the extensions 26 of the bars 21. The lower portions of the levers 35 pass through the slots 20 in the trip members 17 and strike against the upper portion of the asparagus stem held by the gripper fingers 32. The upper ends of the levers 35 are adapted to encounter the under surface of the brackets 18 when the bars 21 and the extensions 26 are moved to elevated positions. Also the upper ends of the stems 28 are adapted to encounter the under surface of the bracket 18 when the bars and extensions are moved to upper positions.

A belt 36 is mounted for orbital movement at the forward portion of the frame 1 and transversely thereof. The belt 36 is moved by intermeshing pinions 37 which are operatively connected by means of a chain 38 with a sprocket wheel 39 mounted upon the side of one of the ground engaging wheels 2.

When the stems of the plant are cut as hereinbefore described, the gripper fingers 32 are lowered with the extensions 26 of the bars 21. When the pins 31 strike the lower edges of the slots 20 in the trip members, the blocks 29 are moved upwardly with relation to the lugs 33 and the gripper members 32 are drawn toward each other by the springs 34 and the cut stem is received and grasped between the lower ends of the gripper members 32. When the bars 21 and extensions 26 are elevated, the gripper members are moved upwardly and the upper ends of stems 28 strike the lower surface of brackets 18 forcing the wedge-shaped blocks 29 between lugs 23, whereby the lower ends of gripper members 32 are spread apart and the stems of the plants released. At the same instant the upper ends of the ogee shaped levers 35 strike the lower side of the bracket 18 whereby the said levers are swung and engage the asparagus stems at the time the gripper members 32 are opened and the stems of the plants are stuck onto the upper run of the belt 36 with their upper ends pointed forwardly. The gripper members 32 are guided in their downward movement to properly engage the stems of the asparagus plants by the pins 31 which slide in the slots 20 of trip members 17 and springs 32' which hold said gripper members approximately parallel to trip members 17.

Having described the invention, what is claimed is:

1. An asparagus harvester comprising a wheel mounted frame, a trip member pivoted thereon, a blade and blade carrying means mounted upon the frame, means for moving the blade carrying means, means operatively connected with the trip member for causing the operation of the means for moving the blade carrying means, means for returning the blade carrying means to normal position, and stem grippers carried by the blade carrying means.

2. In a machine of the character described, a support, a trip member pivotally mounted upon the support, said trip member having a longitudinally disposed slot, a member mounted for movement along the slot, a sleeve carried by said member, gripper members pivoted to the sleeve, means for resiliently holding the gripper members toward each other, a block having a stem slidably received in the sleeve, said block being adapted to spread the gripper members with relation to each other, and a pin carried by the block and disposed in the slot of the trip member and adapted to encounter the edge of the slot to move the block with relation to the gripper members whereby he gripper members may move toward each other.

3. In a machine of the character described, a frame, a trip member pivotally mounted upon the frame, a blade support carried by the frame, means for operatively connecting the trip member with the blade support, gripper members connected with the blade support, and means cooperating with the gripper members and the trip member to move the gripper members with relation to each other.

4. In a machine of the character described, a frame, a trip member pivotally mounted upon the frame, a blade support pivotally mounted upon the frame, means for operatively connecting the trip member with the blade support, gripper members mounted for movement with the blade support, means for spreading the gripper members with relation to each other, and means for moving the gripper members toward each other.

In testimony whereof I affix my signature.

CARL MONTHAN.